US010452182B2

(12) United States Patent
Matsueda et al.

(10) Patent No.: US 10,452,182 B2
(45) Date of Patent: Oct. 22, 2019

(54) DISPLAY DEVICE AND METHOD OF MANUFACTURING THE SAME

(71) Applicant: Tianma Japan, Ltd., Kawasaki, Kanagawa (JP)

(72) Inventors: Yojiro Matsueda, Kawasaki (JP); Kenichi Takatori, Kawasaki (JP)

(73) Assignee: TIANMA JAPAN, LTD., Kawasaki, Kanagawa (JP)

( * ) Notice: Subject to any disclaimer, the term of this patent is extended or adjusted under 35 U.S.C. 154(b) by 39 days.

(21) Appl. No.: 15/816,013

(22) Filed: Nov. 17, 2017

(65) Prior Publication Data

US 2018/0143721 A1    May 24, 2018

(30) Foreign Application Priority Data

Nov. 22, 2016  (JP) ................................. 2016-239858
Jul. 13, 2017  (JP) ................................. 2017-136830

(51) Int. Cl.
*G09G 3/30* (2006.01)
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04103* (2013.01); *G06F 2203/04112* (2013.01)

(58) Field of Classification Search
CPC .................. G06F 3/0412; G06F 3/044; G06F 2203/04103; G06F 2203/04112
USPC .................................. 345/76, 173, 174, 204
See application file for complete search history.

(56) References Cited

U.S. PATENT DOCUMENTS

| 2008/0074041 | A1* | 3/2008 | Nakayama | .......... H01L 27/3246 313/504 |
| 2011/0050604 | A1* | 3/2011 | Kwon | .................... G06F 3/0412 345/173 |
| 2014/0240279 | A1 | 8/2014 | Hwang et al. | |
| 2014/0333852 | A1 | 11/2014 | Ishikawa et al. | |
| 2014/0354617 | A1* | 12/2014 | Nam | ..................... G06F 3/0414 345/212 |

FOREIGN PATENT DOCUMENTS

JP    2014-219606 A    11/2014

\* cited by examiner

*Primary Examiner* — Jennifer T Nguyen
(74) *Attorney, Agent, or Firm* — Sughrue Mion, PLLC

(57) ABSTRACT

A display device includes an insulating substrate, an encapsulation structural unit opposed to the insulating substrate, lower electrodes and one upper electrode disposed between the insulating substrate and the encapsulation structural unit, and organic light-emitting layers each disposed between the one upper electrode and one of the lower electrodes, perforating walls standing toward the encapsulation structural unit, circuits formed between the insulating substrate and the lower electrodes to control supply of electric current to the lower electrodes, and touch panel electrodes formed between the insulating substrate and the lower electrodes. The upper electrode is an electrode configured to transmit light from the organic light-emitting layers toward the encapsulation structural unit and has holes each formed in such a manner that one of the perforating walls stands through the hole. Electric fields generated by the touch panel electrodes pass through the holes in the upper electrodes.

18 Claims, 11 Drawing Sheets

DISPLAY DEVICE AND METHOD OF MANUFACTURING THE SAME

BACKGROUND

This disclosure relates to a display device and a method of manufacturing the display device.

Liquid crystal display devices equipped with a touch panel have been proposed (refer to JP 2014-219606 A, for example). Such a display device is demanded to have a simple structure to reduce the size of the device or the number of components.

In place of the liquid crystal display devices, active-matrix type of organic light-emitting diode (OLED) display devices have also been proposed.

SUMMARY

An aspect of the disclosure is a display device including: an insulating substrate; an encapsulation structural unit opposed to the insulating substrate; a plurality of lower electrodes and one upper electrode disposed between the insulating substrate and the encapsulation structural unit, and a plurality of organic light-emitting layers each disposed between the one upper electrode and one of the plurality of lower electrodes; a plurality of perforating walls standing toward the encapsulation structural unit; a plurality of circuits formed between the insulating substrate and the lower electrodes and configured to control supply of electric current to the lower electrodes; and touch panel electrodes formed between the insulating substrate and the plurality of lower electrodes. The upper electrode is an electrode configured to transmit light from the organic light-emitting layers toward the encapsulation structural unit and has holes each formed in such a manner that one of the plurality of perforating walls stands through the hole. Electric fields generated by the touch panel electrodes pass through the holes in the upper electrodes.

It is to be understood that both the foregoing general description and the following detailed description are exemplary and explanatory and are not restrictive of this disclosure.

EMBODIMENTS

Hereinafter, an embodiment of this invention will be described with reference to the accompanying drawings. It should be noted that the embodiment is merely an example to implement this invention and is not to limit the technical scope of this invention. Elements common to the drawings are denoted by the same reference signs.

Disclosed hereinafter is an active matrix OLED display device with a touch panel integrated (hereinafter, abbreviated as display device as necessary). The display device has a top-emission pixel structure.

Figure 4:
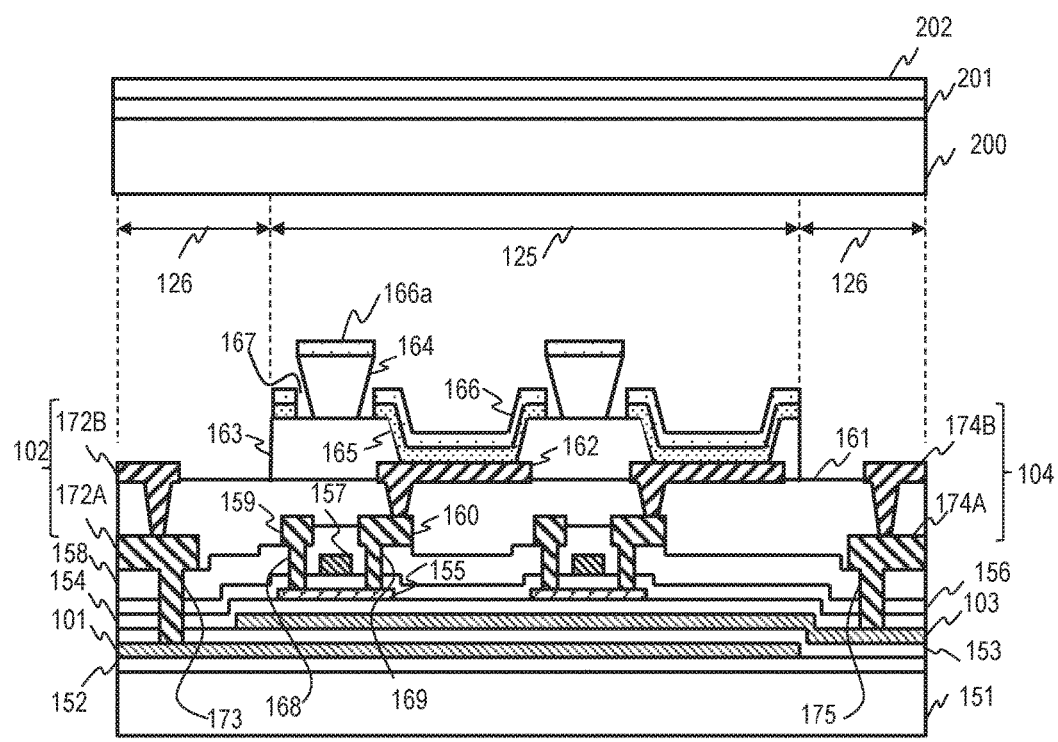
FIG. 4 schematically illustrates a part of a cross-sectional structure of a display device.

The display device in this embodiment has a structure such that, as illustrated in FIG. 4, the electrodes for the touch panel (touch panel electrodes) are disposed between an insulating substrate lying on the opposite side of the light emission side and pixels to achieve a simple structure. In order to pass the electric fields of the touch panel electrodes to the contact surface (the surface where the image is displayed), the upper electrode covering the top of the pixels (on the light emission side) is provided with a plurality of holes. These holes are formed by perforating walls. The electric fields generated by the touch panel electrodes pass through the holes to reach the contact surface to be touched by a pointer such as a finger or a hand. In other words, the touch panel electrodes can form their electric fields on the contact surface through the holes. The detection circuit configured to drive the touch panel electrodes and detect a contact point detects change of the electric fields caused by the pointer (changes in electrostatic capacitance among the pointer and electrodes) to locate the contact point.

First, an overall configuration of a display device 10 in this embodiment is described with reference to FIGS. 1 to 3. Subsequently, details of the display device 10, inclusive of the aforementioned holes, are described with reference to FIG. 4. It should be noted that the elements in the drawings may be exaggerated in size or shape for clear understanding of the description.

Overall Configuration

Figure 1:
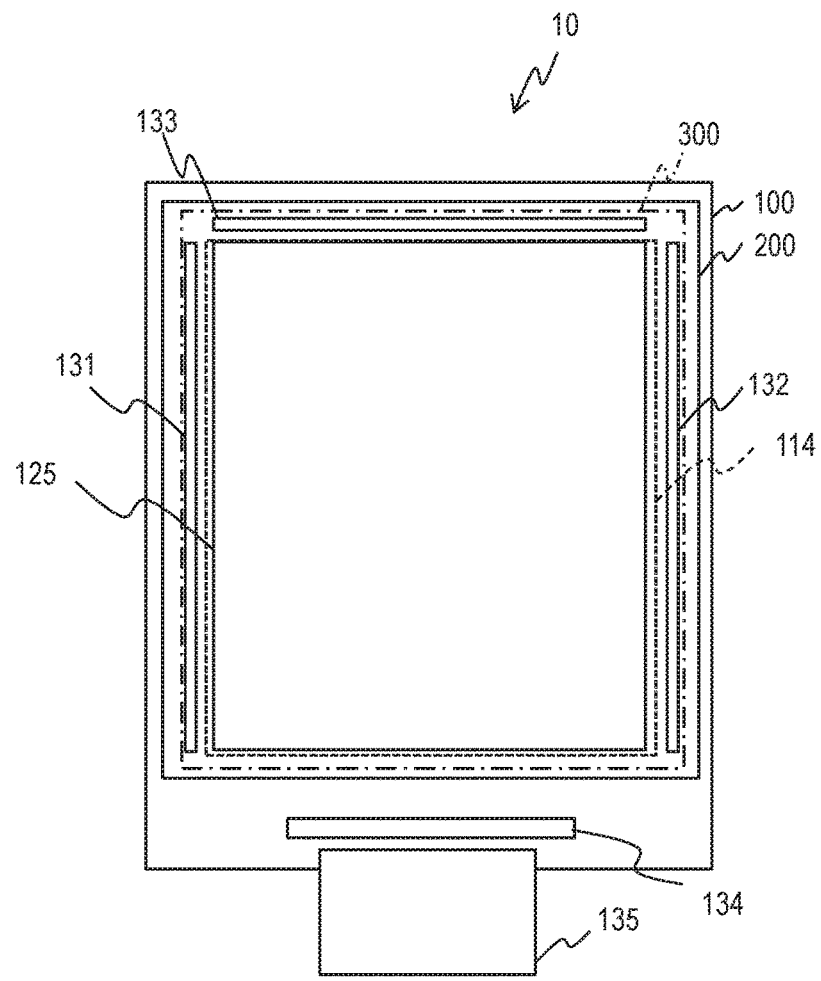
FIG. 1 schematically illustrates a configuration example of a display device.

FIG. 1 schematically illustrates a configuration example of the display device 10 in this embodiment. The display device 10 includes a thin film transistor (TFT) substrate 100 on which light emitting elements are formed, an encapsulation substrate 200 for encapsulating the light emitting elements, and a bond (glass frit sealer) 300 for bonding the TFT substrate 100 with the encapsulation substrate 200. The space between the TFT substrate 100 and the encapsulation substrate 200 is filled with for example, dry air and sealed up with the bond 300.

In the periphery of a cathode electrode forming region 114 outer than the display region 125 in the TFT substrate 100, a scanning driver 131, an emission control driver 132, a protection circuit 133, and a driver IC 134 are provided. These are connected to the external devices via a flexible printed circuit (FPC) 135.

The scanning driver 131 drives scanning lines of the TFT substrate 100. The emission control driver 132 drives emission control lines to control the emission periods of sub-pixels. The driver IC 134 can be mounted with an anisotropic conductive film (ACF). The FPC 135 prevents damage by electrostatic discharge.

The driver IC 134 provides power and timing signals (control signals) to the scanning driver 131 and the emission control driver 132 and further, provides data voltage corresponding to image data to data lines. In other words, the driver IC 134 has a display driver which has a display control function. The driver IC 134 also has a function to control the electrodes (referred to as touch panel electrodes) of the touch panel, in addition to the display control function. Incorporating the touch panel control function into the driver IC 134 for the display pixels enables reduction of components and simplification of wiring.

Circuitry on Substrate

Figure 2:
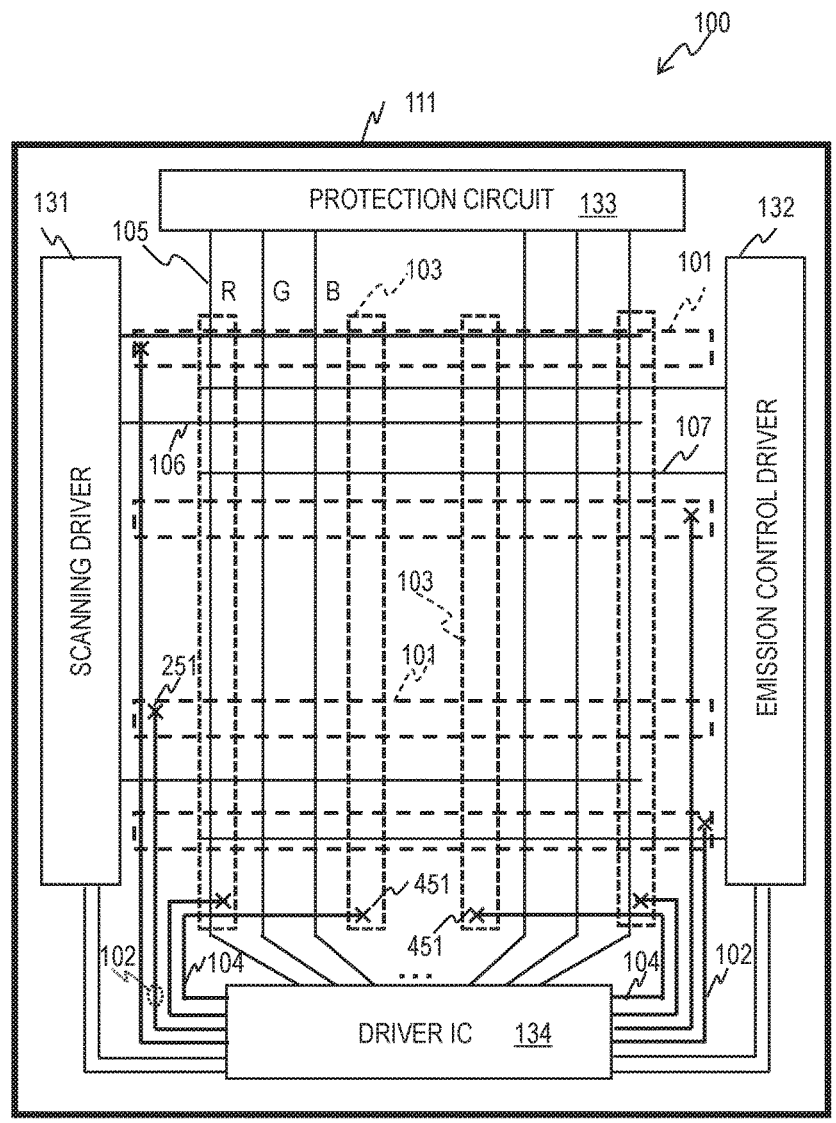
FIG. 2 schematically illustrates circuitry of a TFT substrate.

FIG. 2 schematically illustrates circuitry of the TFT substrate 100. The display device 10 in this embodiment is a so-called touch panel-integrated display device where the touch panel electrodes are disposed on the TFT substrate 100. As will be described later, disposing the touch panel electrodes on the TFT substrate 100 allows the drive IC 134 for display pixels to have a touch panel control function. Comparing to disposing the touch panel electrodes on the encapsulation substrate 200, this configuration can simplify the fabrication.

On an insulating substrate 111, circuits for display and a touch panel are provided. Tx electrodes 101 and Rx electrodes 103 of touch panel electrodes, data lines 105, scanning lines 106, and emission control lines 107 are provided within the display region 125 of the insulating substrate 111. The Tx electrodes 101 and the Rx electrodes 103 of touch panel electrodes are disposed like a matrix. As will be described later, the Tx electrodes 101 and the Rx electrodes 103 are provided on a layer lower than the layer of the data lines 105, the scanning lines 106, and the emission control lines 107.

FIG. 2 shows only a part of the Tx electrodes 101, Rx electrodes 103, data lines 105, scanning lines 106, and emission control lines 107 and omits power lines provided in parallel to the data lines 105 and connected with the driver IC 134.

In the example of FIG. 2, the Tx electrodes 101, the scanning lines 106, and the emission control lines 107 extend in a horizontal direction and spread in a vertical direction. The scanning lines 106 and the emission control lines 107 are provided alternately. The Rx electrodes 103 and the data lines 105 extend in a vertical direction and spread in a horizontal direction.

The data lines 105 are connected with the driver IC 134 and the protection circuit 133; the scanning lines 106 are connected with the scanning driver 131; and the emission control lines 107 are connected with the emission control driver 132.

The Tx electrodes 101 and the Rx electrodes 103 are connected with the driver IC 134. Specifically, each Tx electrode 101 is connected with the first end of a Tx line 102 through a contact 251 provided outside the display region 125. The Tx line 102 can be called a first line. The second end of the Tx line 102 is connected with a terminal of the driver IC 134 outside the display region 125. Each Rx electrode 103 is connected with the first end of an Rx line 104 through a contact 451 provided outside the display region 125. The Rx line 104 can be called a second line. The second end of the Rx line 104 is connected with a terminal of the driver IC 134 outside the display region 125.

Pixel Circuit

Figure 3A:
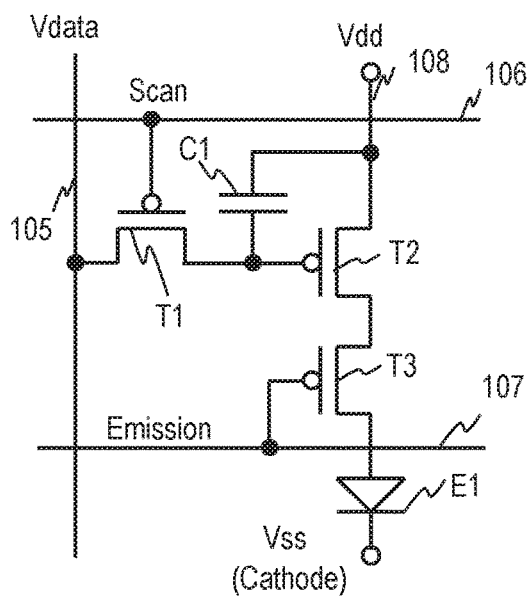
FIG. 3A illustrates a configuration example of a circuit (pixel circuit) of a sub-pixel.

A plurality of circuits (pixel circuits) are formed on the insulating substrate 111 to control the current to be supplied to the anode electrodes of sub-pixels. FIG. 3A illustrates a configuration example of a pixel circuit. Each sub-pixel includes a pixel circuit including a first transistor T1, a second transistor T2, a third transistor T3, and a storage capacitor C1 and an OLED element E1. The transistors are thin film transistors (TFTs). Hereinafter, the first transistor T1 to the third transistor T3 are abbreviated as transistor T1 to transistor T3.

The transistor T1 is a switch for selecting the sub-pixel. The transistor T1 is a p-channel field effect transistor (FET) and its gate terminal is connected with a scanning line 106. The drain terminal is connected with a data line 105. The source terminal is connected with the gate terminal of the transistor T2.

The transistor T2 is a transistor for driving the OLED element E1. The transistor T2 is a p-channel FET and its gate terminal is connected with the source terminal of the transistor T1. The source terminal of the transistor T2 is connected with a power line 108 (Vdd). The drain terminal is connected with the source terminal of the transistor T3. The storage capacitor C1 is provided between the gate terminal and the source terminal of the transistor T2.

The transistor T3 is a switch for controlling supply/stop of the driving current to the OLED element E1. The transistor T3 is a p-channel FET and its gate terminal is connected with an emission control line 107. The source terminal of the transistor T3 is connected with the drain terminal of the transistor T2. The drain terminal is connected with the OLED element E1.

Next, operation of the pixel circuit is described. The scanning driver 131 outputs a selection pulse to the scanning line 106 to open the transistor T1. The data voltage supplied from the driver IC 134 through the data line 105 is stored to the storage capacitor C1. The storage capacitor C1 holds the stored voltage during the period of one frame. The conductance of the transistor T2 changes in an analog manner in accordance with the stored voltage, so that the transistor T2 supplies a forward bias current corresponding to a light emission level to the OLED element E1.

The transistor T3 is located on the supply path of the driving current. The emission control driver 132 outputs a control signal to the emission control line 107 to control the transistor T3 to open or close. When the transistor T3 is open, the driving current is supplied to the OLED element E1. When the transistor T3 is closed, this supply is stopped. The lighting period (duty ratio) in the period of one field can be controlled by opening and closing the transistor T3.

Figure 3B:
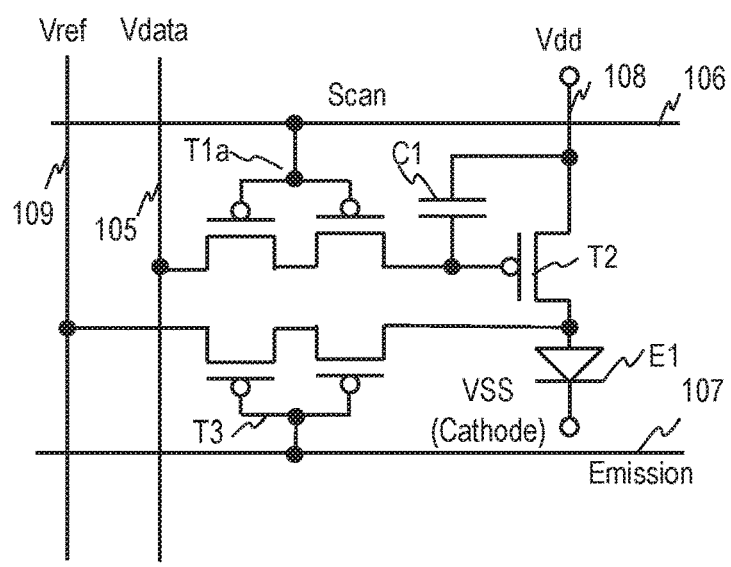
FIG. 3B illustrates another configuration example of a circuit (pixel circuit) of a sub-pixel.

FIG. 3B is another configuration example of a pixel circuit. The differences from the pixel circuit in FIG. 3A are the transistor T1$a$ and the transistor T3. The transistor T1$a$ is a switch having the same function as the transistor T1 in FIG. 3A, or a switch for selecting the sub-pixel. The transistor T1$a$ has a dual-gate structure to reduce the off-state current.

The transistor T3 can be used for various purposes. For example, the transistor T3 can be used to reset the anode electrode of the OLED element E1 once to a sufficiently low voltage that is lower than the black signal level to prevent crosstalk caused by leak current between the transistor T3 and the OLED element E1. The transistor T3 also has a dual-gate structure to reduce the off-state current.

The transistor T3 can also be used to measure a characteristic of the transistor T2. For example, the current-voltage characteristic of the transistor T2 can be accurately measured by measuring the current flowing from the power line 108 (Vdd) to the reference voltage supply line 109 (Vref) under the bias conditions selected so that the transistor T2 will operate in the saturated region and the switching transistor T3 will operate in the linear region. If the differences in current-voltage characteristic among the transistors T2 for individual pixels are compensated for by generating data signals at an external circuit, a highly-uniform display image can be attained.

In the meanwhile, the current-voltage characteristic of the OLED element E1 can be accurately measured by applying a voltage to light the OLED element E1 from the reference voltage supply line 109 when the transistor T2 is off and the transistor T3 is operating in the linear region. In the case where the OLED element E1 is deteriorated because of long-term use, for example, if the deterioration is compensated for by generating a data signal at an external circuit, the display device can have a long life spun.

Touch Panel

Next, the touch panel included in the display device 10 is described. In the display device 10, the touch panel control function of the driver IC 134 detects the coordinates of the point on the contact surface (display screen) touched by the user. The display device 10 includes a capacitive touch panel incorporated therein. Illustrated in FIG. 2 is a projected capacitive touch panel employing mutual capacitance sensing scheme.

The capacitive touch panel detects a change in electrostatic capacitance among the electrodes and a pointer to detect the contact point of the pointer. The capacitive touch panels are categorized into projected capacitive type and surface capacitive type.

A projected capacitive touch panel includes a plurality of strip-shaped X electrodes and Y electrodes. The X electrodes and the Y electrodes are arrayed in a matrix with an insulating film interposed therebetween. When a pointer approaches some X-Y electrodes, the capacitance between the electrodes increases; the touch panel controller detects the change in capacitance of the X-Y lines to detect the location of the pointer.

Capacitance sensing schema for a projective capacitive touch panel includes self-capacitance sensing and mutual capacitance sensing. The self-capacitance sensing scans the X electrodes independently from the Y electrodes to detect a change in capacitance in the individual electrodes.

In a mutual capacitance sensing type of touch panel, Tx electrodes as driving electrodes are disposed orthogonally to Rx electrodes as sensing electrodes with an insulator interposed therebetween; a capacitance (intersection capacitance) is generated at each intersection. If a capacitance caused by a pointer exists in the vicinity of an intersection capacitance, the mutual capacitance at the intersection decreases because the stored electric charge is divided by the capacitance caused by the pointer. The touch panel control function of the driver IC 134 detects at which intersection and how large this change in mutual capacitance has occurred.

The TFT substrate structure of this embodiment is applicable to any type of capacitive touch panel other than the projected capacitive type employing the mutual capacitance sensing scheme or the self-capacitance sensing scheme.

Detailed Structure of Display Device

Next, a detailed structure of the display device 10 is described with reference to FIGS. 4 to 11. FIG. 4 schematically illustrates a part of a cross-sectional structure of the display device 10. The display device 10 includes a TFT substrate 100 (see FIG. 2) and an encapsulation substrate (transparent substrate) 200 opposed to the TFT substrate 100. FIG. 4 schematically illustrates only a part of the configuration of the TFT substrate 100. The definitions of top and bottom in the following description correspond to the top and the bottom of the drawing. In this display device 10, the touch panel electrodes are disposed under the cathode electrode or on the opposite side of the light emission side to achieve a simple structure.

As illustrated in FIG. 4, the display device 10 includes an insulating substrate 151 and an encapsulation structural unit opposed to the insulating substrate 151. An example of the encapsulation structural unit is a flexible or inflexible encapsulation substrate 200. The encapsulation structural unit can be a thin film encapsulation (TFE) structure, for example. The insulating substrate 151 can be regarded as the insulating substrate 111 in FIG. 2.

The display device 10 includes a plurality of lower electrodes (for example, anode electrodes 162), one upper electrode (for example, a cathode electrode 166), and a plurality of organic light-emitting layers 165 disposed between the insulating substrate 151 and the encapsulation structural unit. The cathode electrode 166 is a transparent electrode that transmits the light from the organic light-emitting layers 165 toward the encapsulation structural unit.

An organic light-emitting layer 165 (also called an organic light emitting film 165) is disposed between the cathode electrode 166 and an anode electrode 162. More specifically, the plurality of anode electrodes 162 are disposed on the same plane (for example, on a planarization film 161) and an organic light-emitting layer 165 is disposed over an anode electrode 162.

The display device 10 further includes a plurality of perforating walls 164 standing toward the encapsulation structural unit and a plurality of circuits. The perforating walls are also called projected structures (structural parts). Each of the plurality of circuits is a pixel circuit, for example the one illustrated in FIG. 3A or 3B. Each circuit is formed between the insulating substrate 151 and an anode electrode 162 and controls the electric current to be supplied to the anode electrode 162.

The display device 10 further includes touch panel electrodes formed between the insulating substrate 151 and the anode electrodes 162. The touch panel electrodes can be Tx electrodes 101 for functioning as driving electrodes and Rx electrodes 103 for functioning as sensing electrodes.

As illustrated in FIG. 4, the top-emission pixel structure is configured in such a manner that the cathode electrode 166 common to a plurality of pixels is provided on the light emission side (the upper side of the drawing). The cathode electrode in a conventional top emission OLED display device has a shape that completely covers the entirety of the display region 125. Such a conventional metal cathode electrode covering the entirety of the display region 125 blocks the electric fields of the touch panel electrodes if the touch panel electrodes are just provided under the cathode electrode. The electric fields that allow sensing a contact point of a pointer are not formed on the screen side of the display device. Therefore, the touch panel control circuit is difficult to detect the accurate contact point of the pointer.

However, the cathode electrode 166 in this embodiment has a plurality of holes 167. The holes 167 are formed in such a manner that perforating walls 164 stand through the cathode electrode 166. The holes 167 are to pass the electric fields formed by the Tx electrodes 101. The electric fields pass through the holes 167 to reach the contact surface to be touched by a pointer such as a finger or a hand. This contact surface is the surface where images are displayed, or the outer surface of the display device 10. In other words, if a polarizing plate 202 is provided on the encapsulation structural unit (for example, the encapsulation substrate 200) or a layer thereabove, the contact surface is the surface of the polarizing plate 202.

The shape of the cathode electrode 166 in this embodiment enables the detection circuit (for example, the driver IC 134 in FIG. 2) to drive the Tx electrodes 101 to generate electric fields and further, to detect a change in capacitance because of change of the electric fields caused by a pointer with Rx electrodes 103. The detection circuit can locate the contact point of the pointer on the contact surface with reference to this change.

The disposition of the touch panel electrodes in the display device of this embodiment achieves reduction in device size, number of components, and manufacturing steps. To mount a touch panel on an OLED display device, there is an approach (hereinafter, referred to as first approach) that bonds the touch panel itself to the screen of the OLED display device. For the first approach, the touch panel needs to include a transparent first substrate for functioning as a contact surface, a transparent second substrate to be bonded to the screen of the display device, and touch panel electrodes between the first substrate and the second substrate. The first approach that bonds the touch panel to the screen of the OLED display device increases the overall thickness of the display device and further, increases the device size. Furthermore, the number of components increases as well.

Compared to the first approach, the display device in this embodiment does not need either the first substrate or the second substrate because the touch panel electrodes are incorporated in the display device; therefore, the device size and the number of components can be reduced. Furthermore, the bonding becomes unnecessary, which enables reduction in man-hour and cost.

There is another approach (hereinafter, referred to as second approach) to mount a touch panel onto an OLED display device. The second approach directly provides the touch panel electrodes on the screen of the display device and places the first substrate for functioning as the contact surface thereon. Unlike the first approach, the second approach does not need the second substrate. However, the second approach requires mounting the driving circuit of the touch panel electrodes by chip on film (COF) and electrically connecting the COF-mounted driving circuit to the touch panel electrodes using an external FPC. This way of mounting does not allow the driving circuit of the touch panel electrodes to be integrated with the driver IC for performing display control; the structure becomes complicated. This complication of structure applies to the first approach.

Compared to the first approach and the second approach, the display device in this embodiment allows the Tx electrodes 101 and the Rx electrodes 103 to be electrically connected to the driver IC 134 provided on the insulating substrate 151 using the lines (102, 104) provided on the insulating substrate 151. For this reason, the driver IC 134 can be integrated with the driver circuit of the touch panel electrodes. In other words, the drive IC 134 includes integrally the driving circuit of the plurality of pixel circuits and the driving circuit of the touch panel electrodes. Accordingly, the display device in this embodiment can have a simple structure. As a result, downsizing becomes available.

The display device in this embodiment does not need the aforementioned COF mounting and as a result, does not need the FPC required in the COF mounting. Accordingly, the manufacturing steps can be simplified and the number of components can be reduced.

In addition, the first and the second approaches employ transparent electrodes for the touch panel electrodes and dispose the touch panel electrodes over the screen. For this reason, the user may perceive the transparent electrodes depending on the effects of the light from the external (such as sunlight or illumination light) or the position of the viewpoint. For example, the user perceives a stripe pattern because of the touch panel electrodes. The user is bothered by this pattern. The display device in this embodiment, however, does not allow the user to perceive the touch panel electrodes because the touch panel electrodes are provided under the pixels. Accordingly, the user is not bothered by the pattern.

Hereinafter, the display device 10 is described in more detail. The TFT substrate 100 includes touch panel electrodes and sub-pixels (pixels) disposed within the display region 125 and lines provided in the wiring region 126 surrounding the display region 125. The lines connect the touch panel electrodes and the pixel circuits with the control circuits (131, 132, 133, 135) provided in the wiring region 126. It should be noted that the cross-sectional structure in this embodiment is illustrated as having narrow display region 125 and wiring region 126 for simplification of the drawing. In other words, the cross-sectional structure in the drawing is a part of the display region 125 and wiring region 126.

A sub-pixel displays one of the colors red, green, and blue. A red sub-pixel, a green sub-pixel, and a blue sub-pixel constitute one pixel (main pixel). A sub-pixel is composed of an OLED element and a pixel circuit including a plurality of transistors (see FIGS. 3A and 3B). The OLED element is composed of an anode electrode of a lower electrode, an organic light-emitting layer, and a cathode electrode of an upper electrode. A plurality of OLED elements are formed of one cathode electrode 166, a plurality of anode electrodes 162, and a plurality of organic light-emitting layers 165.

In FIG. 4, the sub-pixels (OLED elements) have a top emission structure. Tx electrodes 101 and Rx electrodes 103 are provided over the insulating substrate 151 with a first insulating film 152 interposed between the insulating substrate 151 and the electrodes. The insulating substrate 151 is made of glass or resin, for example, and is flexible or inflexible. In the following description, the side closer to the insulating substrate 151 is defined as lower side and the side farther from the insulating substrate 151 is defined as upper side.

The Tx electrodes 101 and the Rx electrodes 103 are insulated from each other by a second insulating film 153. The Tx electrodes 101 and the Rx electrodes 103 are made of a metal having a high melting point, such as Mo (molybdenum), Nb (niobium), W (tungsten), or an alloy of a metal having a high melting point.

In the example of FIG. 4, the Rx electrodes 103 are provided upper than the Tx electrodes 101; however, the locational relation therebetween is not limited to this. Any layer arrangement is acceptable as far as the Tx electrodes 101 and the Rx electrodes 103 are insulated from each other.

Above the Tx electrodes 101 and the Rx electrodes 103, channels (a semiconductor layer) 155 are provided with a third insulating film 154 interposed. The channels 155 include low-temperature poly-silicon (LTPS), for example.

Above the channels 155, gate electrodes 157 are provided with a gate insulating film 156 interposed. An interlayer insulating film 158 is provided over the gate electrodes 157. Within the display region 125, source electrodes 159 and drain electrodes 160 are provided above the interlayer insulating film 158. Within the wiring region 126, a lower layer 172A of Tx lines and a lower layer 174A of Rx lines are provided. The source electrodes 159, the drain electrodes, 160, the lower layer 172A of Tx lines and the lower layer 174A of Rx lines are formed of a metal having a high melting point or an alloy of such a metal.

Each source electrode 159 and each drain electrode 160 are connected with a channel 155 through contacts 168 and 169 provided in a contact hole of the interlayer insulating film 158. The lower layer 172A of Tx lines and the lower layer 174A of Rx lines are connected with the Tx electrodes 101 and the Rx electrodes 103, respectively, through contacts 173 and 175 provided in contact holes in the interlayer insulating film 158.

Over the source electrodes 159, the drain electrodes 160, the lower layer 172A of Tx lines, and the lower layer 174A of Rx lines, an insulative planarization film 161 is provided. Above the insulative planarization film 161, anode electrodes 162, an upper layer 172B of a part of the Tx lines, and an upper layer 174B of a part of the Rx lines are provided. The planarization film 161 is optional between the lower layer 172A of Tx lines and the upper layer 172B of Tx lines and between the lower layer 174A of Rx lines and the upper layer 174B of Rx lines.

Each anode electrode 162 is connected with a drain electrode 160 through a contact provided in a contact hole in the planarization film 161. The upper layer 172B of Tx lines and the upper layer 174B of Rx lines are connected with the lower layer 172A of Tx lines and the lower layer 174A of Rx lines, respectively, through contacts provided in contact holes in the planarization film 161. The pixel circuits (TFTs) are formed below the anode electrodes 162.

Above the anode electrodes 162, an insulative pixel defining layer (PDL) 163 is provided to separate OLED elements. An OLED element is composed of an anode electrode 162, an organic light-emitting layer 165, and the cathode electrode 166 (a part thereof). The OLED element is formed in an opening of the pixel defining layer 163. As illustrated in FIG. 4, a sub-pixel (OLED element) has a top emission structure.

Insulative perforating wall 164 are provided on the pixel defining layer 163 between anode electrodes 162. In other words, the perforating walls 164 are formed on a non-opening area of the pixel defining layer 163. The perforating walls 164 are provided between OLED elements so as not to overlap with the OLED elements. Accordingly, the perforating walls 164 do not interfere with the display function of the OLED elements.

The perforating walls 164 stand on the pixel defining layer 163 toward the encapsulation substrate 200 thereabove; the top faces of the perforating walls 164 are located higher than the top face of the pixel defining layer 163 or closer to the encapsulation substrate 200. The top faces of the perforating walls 164 are located higher than the OLED elements or closer to the encapsulation substrate 200, the perforating walls 164 serve as spacers for maintaining the space between the OLED elements and the encapsulation substrate 200 by supporting the encapsulation substrate 200 when the encapsulation substrate 200 is deformed.

Each perforating wall 164 in the example of FIG. 4 has an inverted tapered shape. In other words, the size of the perforating wall 164 in the in-plane direction of the insulating substrate 151 gradually decreases from the top to the bottom; the top face of the perforating wall 164 covers the bottom face of the perforating wall 164 when the perforating wall 164 is seen vertically to the insulating layer 151. The perforating wall can have a normally tapered shape. In other words, the size of the normally tapered perforating wall in the in-plane direction of the insulating substrate 151 gradually increases from the top to the bottom; the top face of this wall is within the bottom face of this wall when this wall is seen vertically to the insulating substrate 151. Alternatively, the perforating wall can have a vertical shape. In other words, the wall (side wall) of the perforating wall can stand straight.

Above each anode electrode 162, an organic light-emitting layer 165 is provided. The organic light-emitting layer 165 is in contact with the pixel defining layer 163 in an opening and its periphery. A cathode electrode 166 is provided over the organic light-emitting layer 165. The cathode electrode 166 is a transparent electrode. The cathode electrode 166 transmits all or part of the visible light from the organic light-emitting layer 165.

The laminated film of the anode electrode 162, the organic light-emitting layer 165, and the cathode electrode 166 formed at an opening of the pixel defining layer 163 corresponds to an OLED element. The cathode electrode 166 is common to the anode electrodes 162 and the organic light-emitting layers 165 (OLED elements) that are formed separately. A not-shown cap layer may be provided over the cathode electrode 166.

As illustrated in FIG. 4, the cathode electrode 166 in this embodiment has holes 167. A perforating wall 164 stands through the cathode electrode 166 to form a hole 167.

As will be described later, forming the perforating walls 164 before forming the cathode electrode 166 enables the holes 167 to be formed at laminating the material of the cathode electrode 166. In forming the layer of the cathode electrode 166, the layer of the cathode electrode 166 is separated by the perforating walls 164 so that the holes 167 are formed. Simultaneously, the material of the cathode electrode 166 adheres to the tops of the perforating walls 164 as residuals 166a.

The encapsulation substrate 200 is fixed at a predetermined distance from the TFT substrate 100. The encapsulation substrate 200 is a transparent insulating substrate, which can be made of glass. A λ/4 plate 201 and a polarizing plate 202 are provided over the light emission surface (top face) of the encapsulation substrate 200 to prevent reflection of light entering from the external.

The pixel structure of this embodiment is top emission type, as already mentioned. Part of the light from an organic light-emitting layer 165 is reflected by the anode electrode 162, passes through the cathode electrode 166 and the encapsulation substrate 200, and reaches the display surface (contact surface) of the display device 10. In the case where the OLED element has a cavity structure, the light from the organic light-emitting layers 165 is repeatedly reflected between the reflective anode electrode 162 and a semi-transmissive cathode electrode 166. This multi-reflection yields resonance effect that amplifies the light having a resonant wavelength. The light in which the wavelength component of the color of the sub-pixel is emphasized by the resonance effects goes out from the semi-transmissive transparent cathode electrode 166 toward the display surface of the display device 10.

The Tx electrodes 101 and the Rx electrodes 103 for the touch panel are disposed under the sub-pixels (in the lower part of the drawing). This disposition allows the touch panel electrodes to be formed on the TFT substrate 100 without substantially affecting the forming of the organic light-emitting layers and the pixel circuits.

Manufacturing Method

FIGS. 5A to 5I schematically illustrate an example of a method of manufacturing the display device 10. The following manufacturing method is an example; any other manufacturing method can be employed as far as the panel structure of this embodiment can be fabricated. In the following description, the elements formed in the same step (simultaneously) are the elements on the same layer.

Figure 5A:
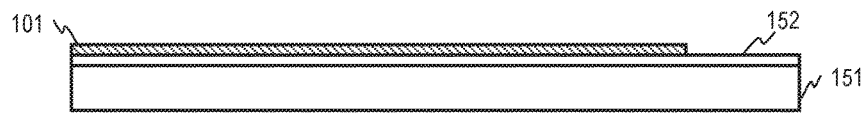
FIG. 5A schematically illustrates an example of a method of manufacturing a display device.

The method of manufacturing the display device 10 first deposits silicon nitride, for example, onto the insulating substrate 151 made of glass by chemical vapor deposition (CVD) to form a first insulating film 152 as illustrated in FIG. 5A. Next, the method deposits a metal having a high melting point on the first insulating film 152 by sputtering and patterns the high-melting-point metal to form (a layer of) Tx electrodes 101. The Tx electrodes are also referred to as first electrodes.

Figure 5B:
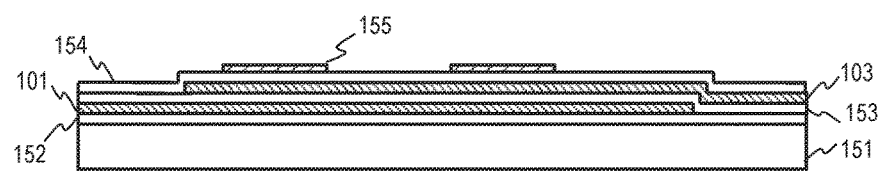
FIG. 5B schematically illustrates an example of a method of manufacturing a display device.

Next, as illustrated in FIG. 5B, the method deposits silicon nitride, for example, onto the Tx electrodes 101 and the first insulating film 152 by CVD to form a second insulating film 153. The method deposits a high-melting-point metal onto the second insulating film 153 by sputtering, patterns the high-melting-point metal to form (a layer of) Rx electrodes 103. The Rx electrodes are also referred to as second electrodes. The high-melting-point metal can be a pure metal having a high melting point or an alloy having a high melting point, such as Mo, W, Nb, MoW, or MoNb. Through the foregoing steps, a touch panel part (touch panel electrodes) is formed. Employing the high-melting-point metal prevents the touch panel electrodes from being affected by the subsequent steps.

Next, the method deposits silicon nitride, for example, onto the second insulating film 153 and the Rx electrodes 103, or the touch panel electrodes, by CVD to form a third insulating film 154. Next, the method forms a layer including channels 155 (semiconductor layer) of poly-silicon by a known low-temperature poly-silicon TFT fabrication technique. For example, the method can form the poly-silicon layer by depositing amorphous silicon by CVD and crystalizing the amorphous silicon by excimer laser annealing (ELA). The poly-silicon layer is used to connect elements within the display region 125.

Figure 5C:
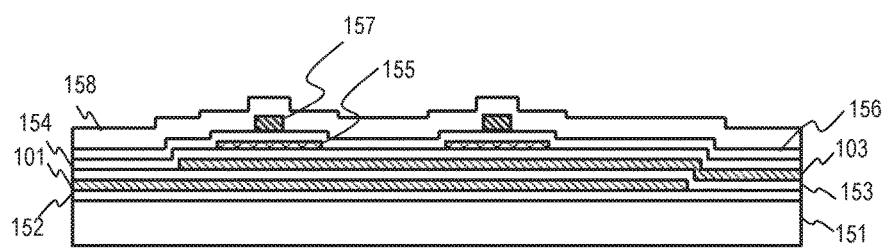
FIG. 5C schematically illustrates an example of a method of manufacturing a display device.

Next, as illustrated in FIG. 5C, the method deposits silicon oxide, for example, onto the poly-silicon layer including the channels 155 and the third insulating film 154 by CVD to form a gate insulating film 156. The gate insulating film is also referred to as fourth insulating film. Furthermore, the method deposits a metal by sputtering and patterns the metal to form a metal layer including gate electrodes 157. Specifically, each gate electrode 157 is formed above a channel 155 and on the gate insulating film 156. The metal can be Mo, Nb, W, an alloy of Mo and Nb, or an alloy of Mo and W.

The metal layer includes storage capacitance electrodes, scanning lines 106, emission control lines 107, and power lines, in addition to the gate electrodes 157. The metal layer may be a single layer made of one material selected from a group consisting of Mo, W, Nb, MoW, MoNb, Al, Nd, Ti, Cu, a Cu alloy, an Al alloy, Ag, and an Ag alloy. Alternatively, the metal layer may be a laminated layer to reduce the wiring resistance. The laminated layer has a multi-layer structure including two or more layers made of a low-resistive material such as Mo, Cu, Al, Ag, or an alloy thereof.

Next, the method dopes additional impurities to the channels 155 doped with high-concentration impurities before formation of the gate electrodes 157 using the gate electrodes 157 as a mask. Thereby, a layer of low-concentration impurities is formed and the TFTs are provided with lightly doped drain (LDD) structure. Next, the method deposits silicon oxide by CVD to form an interlayer insulating film 158 to cover the gate electrodes 157 and the gate insulating film 156. The interlayer insulating film is also referred to as fifth insulating film.

Figure 5D:
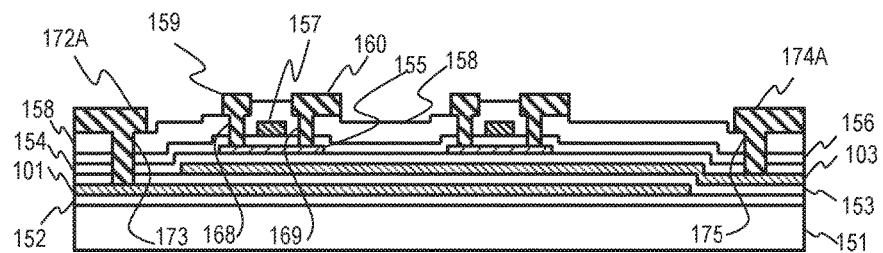
FIG. 5D schematically illustrates an example of a method of manufacturing a display device.

As illustrated in FIG. 5D, the method opens contact holes in the interlayer insulating film 158, the gate insulating film 156, the third insulating film 154, and the second insulating film 153 by anisotropic etching. The contact holes for the contacts 168 and 169 to connect the source electrodes 159 and the drain electrodes 160 to the channels 155 are formed in the interlayer insulating film 158 and the gate insulating film 156.

The contact holes for the contacts 175 (see the contact 451 in FIG. 2) to connect the Rx electrodes 103 to the Rx lines 104 are formed in the interlayer insulating film 158, the gate insulating film 156, and the third insulating film 154.

The contact holes for the contacts 173 (see the contact 251 in FIG. 2) to connect the Tx electrodes 101 to the Tx lines 102 are formed in the interlayer insulating film 158, the gate insulating film 156, the third insulating film 154, and the second insulating film 153. Opening the contact holes for connecting the touch panel electrodes to the touch panel lines simultaneously with the contact holes for the TFTs eliminates increase in manufacturing step.

The Tx lines 102 and the Rx lines 104 are connected with the driver IC 134 having both of the display control function and the touch panel control function and moreover, the Tx electrodes 101, the Tx lines 102, the Rx electrodes 103, the Rx lines 104, and the driver IC 134 are provided on the same substrate (insulating substrate 151) as described with reference to FIG. 2. Accordingly, an external FPC for connecting the touch panel electrodes to the driver IC is unnecessary. As a result, the structure is simplified and further, the number of component is reduced.

Next, the method deposits an aluminum alloy such as Ti/Al/Ti by sputtering and patterns the alloy to form a metal layer. The metal layer includes source electrodes 159, drain electrodes 160, contacts 168 and 169, a lower layer 172A of Tx lines, contacts 173, a lower layer 174A of Rx lines, and contacts 175. In addition to these, data lines 105 and power lines are also formed. Forming the touch panel lines simultaneously with the electrodes of the TFTs eliminates increase in manufacturing step.

Figure 5E:
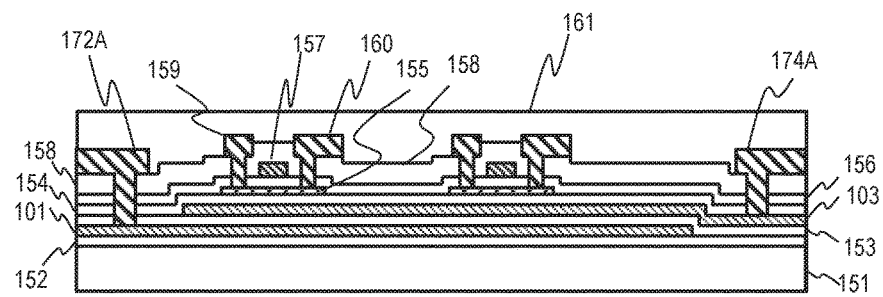
FIG. 5E schematically illustrates an example of a method of manufacturing a display device.
Figure 5F:
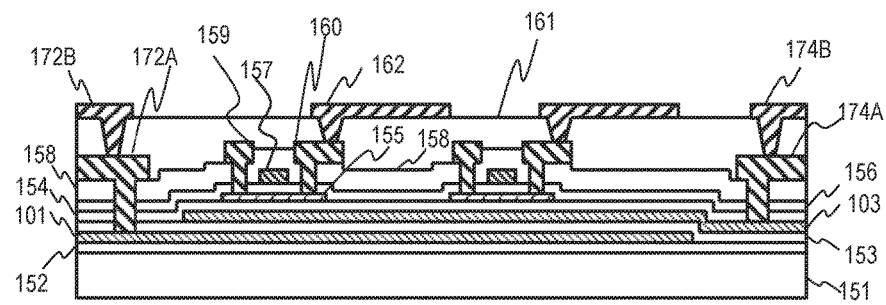
FIG. 5F schematically illustrates an example of a method of manufacturing a display device.

Next, the method deposits a photosensitive organic material to form a planarization film 161 as illustrated in FIG. 5E. Subsequently, the method opens contact holes for connecting to the drain electrodes 160 of the TFTs and contact holes for connecting to the lower layer 172A of Tx lines and the lower layer 174A of Rx lines as illustrated in FIG. 5F. Opening the contact holes for connecting the touch panel lines simultaneously with the contact holes for the TFTs eliminates increase in manufacturing step.

The method forms anode electrodes 162 on the planarization film 161 having contact holes. The method further forms an upper layer 172B of Tx lines and an upper layer 174B of Rx lines. An anode electrode 162 includes three layers of a transparent film made of ITO, IZO, ZnO, $In_2O_3$, or the like, a reflective film made of Ag, Mg, Al, Pt, Pd, Au, Ni, Nd, Ir, Cr, or a metallic compound thereof, and another transparent film as mentioned above. The three-layer structure of the anode electrode 162 is merely an example and the anode electrode 162 may have a two-layer structure. The upper layer 172B of Tx lines and the upper layer 174B of Rx lines are metal layers made of Ag, Mg, Al, Pt, Pd, Au, Ni, Nd, Ir, Cr, or a metallic compound thereof. This structure of the upper layer 172B of Tx lines and the upper layer 174B of Rx lines is also an example.

The anode electrodes 162, the upper layer 172B of Tx lines, and the upper layer 174B of Rx lines are connected to the drain electrodes 160, the lower layer 172B of Tx lines, and the lower layer 174A of Rx lines, respectively, through contacts. The method forms the touch panel lines simultaneously with the electrodes of the TFTs to eliminate increase in manufacturing step.

Figure 5G:
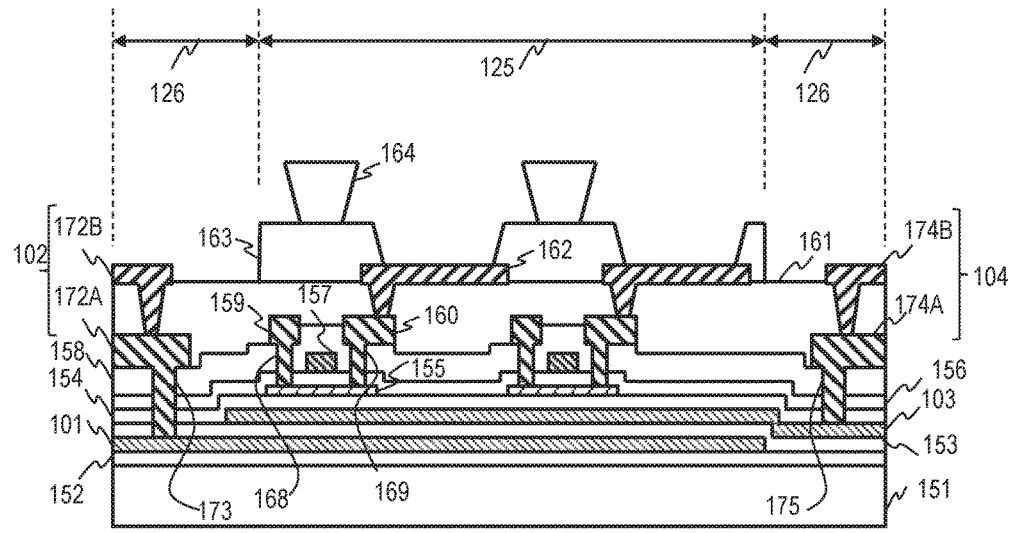
FIG. 5G schematically illustrates an example of a method of manufacturing a display device.

Next, as illustrated in FIG. 5G, the method deposits a photosensitive organic resin by spin coating and patterns the photosensitive organic resin to form a pixel defining layer 163. The patterning creates holes in the pixel defining layer 163; the anode electrodes 162 of the sub-pixels are exposed at the bottom of the created holes. The side walls of the holes in the pixel defining layer 163 are normally tapered. The pixel defining layer 163 forms separate light emitting regions of sub-pixels.

The method further deposits a photosensitive organic resin by spin coating and patterns the photosensitive organic resin to form perforating walls 164 on the pixel defining layer 163. The photosensitive organic resin is patterned so that the perforating walls 164 have inverted tapered shapes. The perforating walls 164 can be made of a negative photosensitive resin or a positive photosensitive resin provided with an image inverting function.

For example, the negative photosensitive resin is insoluble to the developer in an area exposed to exposure light. The exposure light is absorbed by the negative photosensitive resin and the exposure intensity in the exposed area of the negative photosensitive resin decreases as getting closer to the pixel defining layer 163.

When the exposed negative photosensitive resin is developed, the dissolving rate is higher in the vicinity of the pixel defining layer where the exposure intensity is relatively low than in the vicinity of the surface of the negative photosensitive resin. For this reason, perforating walls 164 having an inverted tapered cross-section can be formed. Desired inverted tapered shapes can be formed by selecting exposure conditions and conditions such as curing temperature as appropriate.

The perforating walls 164 may be formed by another method. Each perforating wall 164 can have any shape of cross-section as far as it can open a hole in a cathode electrode 166. For example, the perforating wall 164 may have an overhang shape different from the inverted tapered shape. The overhang shape is larger at the top face than at the bottom face so that the top face covers the bottom face. In this disclosure, the inverted tapered shape is included in the overhang shape. Another example of the overhang shape is an undercut shape having a T-shaped cross-section.

Figure 5H:
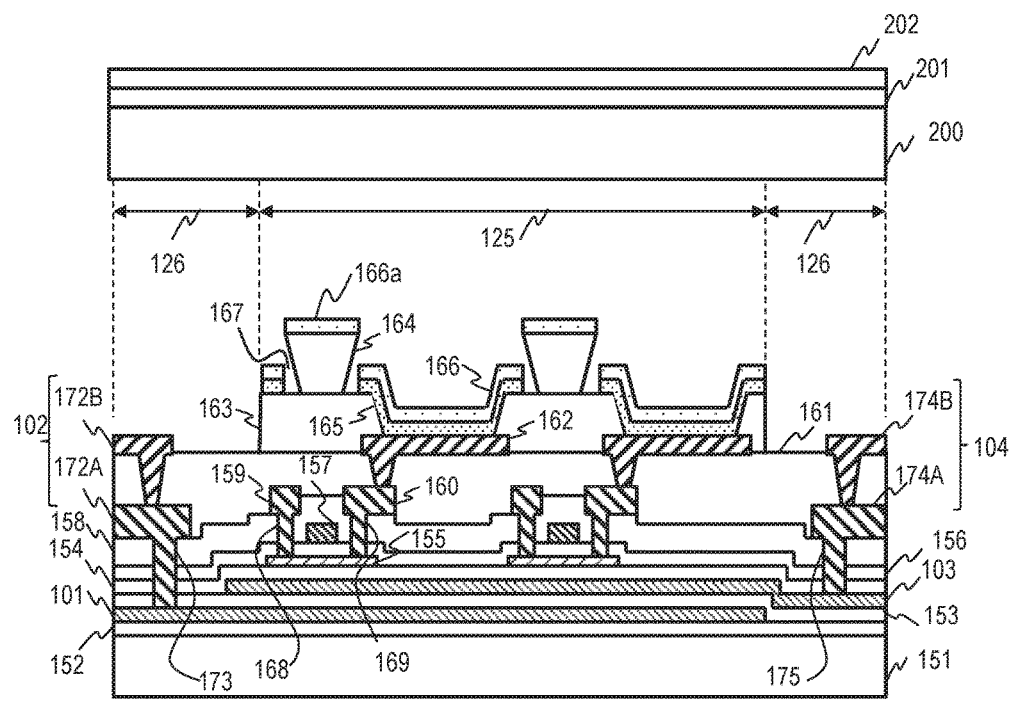
FIG. 5H schematically illustrates an example of a method of manufacturing a display device.

Next, as illustrated in FIG. 5H, the method applies organic light-emitting materials onto the insulating substrate 151 provided with the pixel defining layer 163 to form organic light-emitting layers 165. An organic light-emitting layer 165 is formed by depositing an organic light-emitting material for the color of R, G, or B on each anode electrode 162.

The formation of an organic light-emitting layer 165 uses a metal mask (MM). The metal mask is prepared for the pattern of the sub-pixels of a specific color and a plurality of metal masks are prepared for different colors. The method places and attaches the metal mask onto the surface of the TFT substrate 100 in correct alignment. The method evaporates an organic light-emitting material onto the TFT substrate 100 to be deposited to the places corresponding to the sub-pixels through the openings of the metal mask.

The organic light-emitting layer 165 consists of, for example, a hole injection layer, a hole transport layer, a light emitting layer, an electron transport layer, and an electron injection layer in this order from the bottom. The organic light-emitting layer 165 may have any structure selected from the structures of electron transport layer/light emitting layer/a hole transport layer, electron transport layer/light emitting layer/a hole transport layer/hole injection layer, electron injection layer/electron transport layer/light emitting layer/hole transport layer, and mono-light emitting layer. Another layer such as electron blocking layer may be added. The materials of the light emitting layers are different depending on the color of the sub-pixel; the film thicknesses of the hole injection layer and the hole transport layer are controlled depending on the color.

Figure 5I:
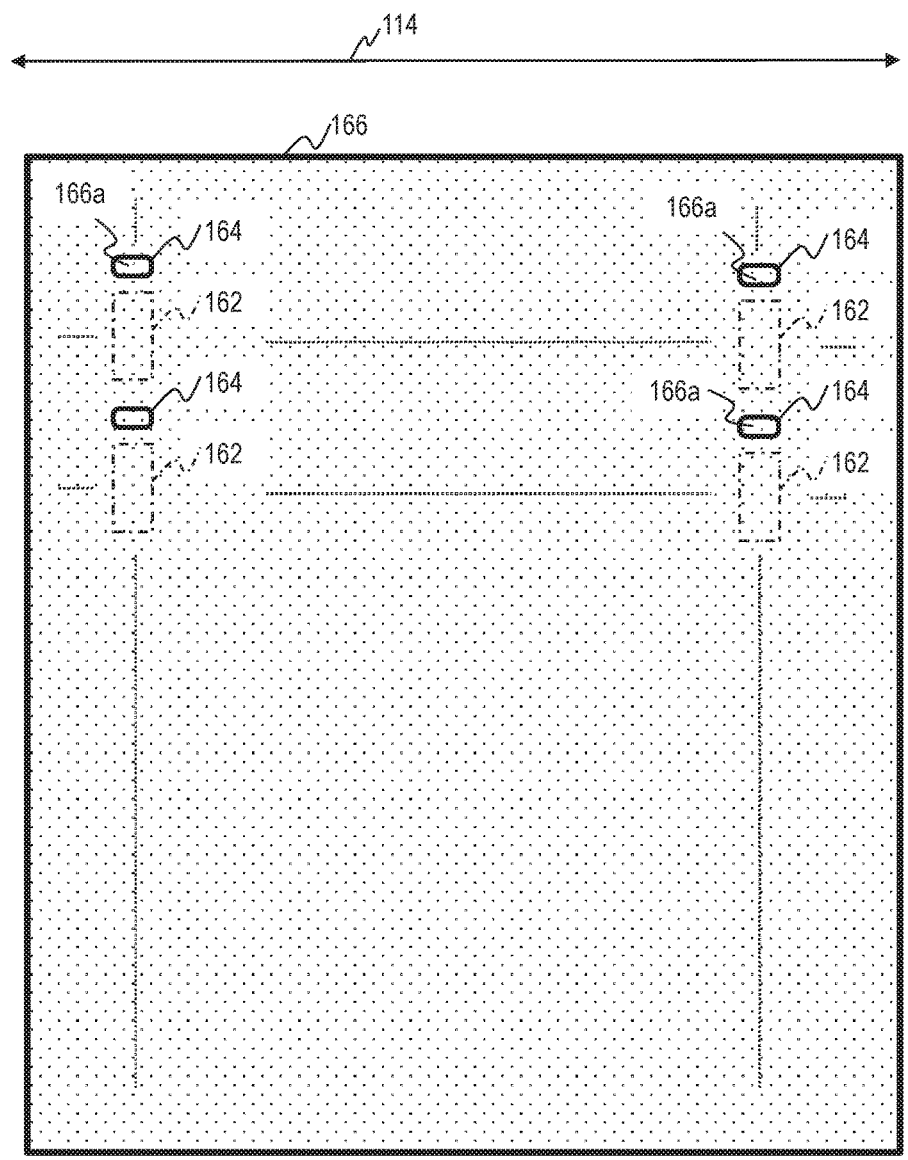
FIG. 5I schematically illustrates an example of a method of manufacturing a display device.

Next, as illustrated in FIG. 5H, the method applies a metal material for the cathode electrode 166 onto the TFT substrate 100 where the pixel defining layer 163, the perforating walls 164, and the organic light-emitting layers 165 (in the openings of the pixel defining layer 163) are exposed. The metal material adheres to the organic light-emitting layers 165 and the top faces of the perforating walls 164. The metal material deposited on the organic light-emitting layer 165 is the cathode electrode 166. The metal material deposited on the top faces of the perforating walls 164 are residuals 166a. FIG. 5I schematically illustrates a planar shape of one cathode electrode 166. On each of the plurality of perforating walls 164, a residual 166a is deposited. Further, as illustrated in FIGS. 4 and 5H, a hole 167 (see FIGS. 4 and 5H) is formed by the perforating wall 164.

As illustrated in FIG. 4, the top faces of the perforating walls 164 are located higher than the surfaces of the organic light-emitting layers 165 and the perforating walls 164 have inverted tapered shapes. Accordingly, the metal layer (cathode electrode 166) is cut by the perforating walls 164 so that holes 167 are formed. The perforating walls 164 having tapered shapes enables opening the holes in the cathode electrode 166 (the layer thereof) in applying the metal material, eliminating additional patterning.

The layer of the transparent cathode electrode 166 is formed by vapor-deposition of Li, Ca, LiF/Ca, LiF/Al, Al, Mg, or an alloy thereof, for example. The film thickness of the cathode electrode 166 is optimized to increase the light-extraction efficiency and ensure better view angle dependence. If the resistance of the cathode electrode 166 is so high that the uniformity of the luminance of the emitted light is impaired, an additional auxiliary electrode layer may be formed of a material for a transparent electrode, such as ITO, IZO, ZnO, or $In_2O_3$. To increase the light extraction efficiency, a cap layer may be formed by depositing an insulator having a refractive index higher than glass after forming the cathode electrode 166.

Through the foregoing processes, OLED elements corresponding to R, G, and B sub-pixels are formed; the areas where the anode electrodes 162 are in contact with the organic light-emitting layers 165 (within the openings in the pixel defining layer 163) become R light emitting regions, G light emitting regions, and B light emitting regions.

Next, the method applies glass frit to the periphery of the TFT substrate 100, places an encapsulation substrate 200 thereon, and heats and melts the glass frit with a laser beam to seal the TFT substrate 100 and the encapsulation substrate 200. Thereafter, the method forms a λ/4 plate 201 and a polarizing plate 202 on the light emission side of the encapsulation substrate 200 to complete the fabrication of the display device 10.

The above-described manufacturing method in this embodiment creates perforating walls 164 having inverted tapered cross-sections at predetermined locations before forming organic light-emitting layers 165, so that the holes 167 are created simultaneously with application of the material of the cathode electrode 166. This manufacturing method also achieves fabrication of a touch panel integrated display device having a simple structure with a small number of photomasks.

Figure 6:
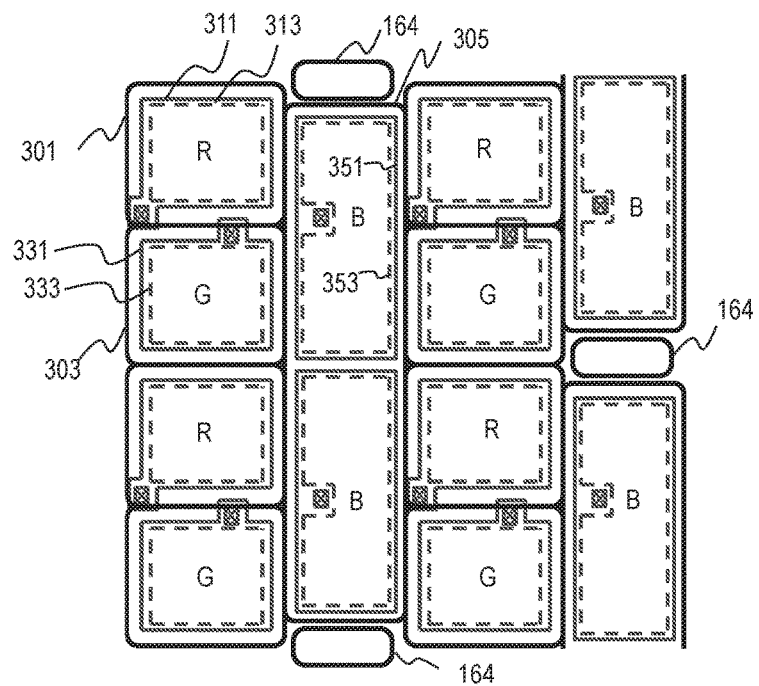
FIG. 6 schematically illustrates an example of arrangement of sub-pixels and perforating walls in a display device.

FIG. 6 schematically illustrates an example of arrangement of sub-pixels and perforating walls in the display device 10. The sub-pixels of R, G, and B correspond to light emitting regions (surrounded by dashed lines) 313, 333, and 353 that function as light emitting elements. Each light emitting region corresponds to an opening in the pixel defining layer 163. The rectangles 311, 331, and 351 surrounding the light emitting regions 313, 333, and 353 correspond to anode electrodes 162.

When selectively depositing organic light-emitting materials using metal masks, a metal mask having openings 301 a little larger than the light emitting regions 313, a metal mask having openings 303 a little larger than the light emitting regions 333, and a metal mask having openings 305 a little larger than the light emitting regions 353 are selected and set on the TFT substrate 100 in correct alignment and the organic light-emitting materials for individual colors are selectively deposited in turn. Since the electric current flows only within the openings of the pixel defining layer 163, these regions become light emitting regions.

The boundaries of pixels are not defined by any component of the TFT substrate 100 but the relation of adjacent sets of sub-pixels in the repeatedly disposed sets of sub-pixels; each pixel may have a rectangular shape or a shape other than a rectangle.

The pixel layout in FIG. 6 is of a basic pixel array structure in S-stripe arrangement. The pixel array structure in S-stripe arrangement is such that an R sub-pixel and a G sub-pixel are disposed in the column direction and a B sub-pixel is disposed in the row direction with respect to the R and G sub-pixels. As to the pixels on the odd-number columns, a pixel on an odd-number row is paired with the pixel on the next even-number row; as to the pixels on the even-number columns, a pixel on an even-number row is paired with the pixel on the next odd-number row. The organic light-emitting material layers of the B sub-pixels of the paired pixels are continuous.

Since the two B sub-pixels of a pair of pixels are driven separately, the anode electrodes 162 are separate. The organic light-emitting material in the area where no anode electrode 162 is provided does not contribute to light emission; accordingly, the organic light-emitting layer 165 formed across pixels does not cause any problem. Expanding the area of the B-light emitting region lowers the current density in the B-light emitting region, reducing the deterioration of the organic light-emitting material for blue color. As a result, the display device can attain a longer life.

The deposition regions of the organic light-emitting material are defined by the openings 301, 303, and 305 of the metal masks, while the light emitting regions 313, 333, and 353 are defined by the openings of the pixel defining layer 163. To prevent shortage between an anode electrode 162 and the cathode electrode 166 or color drift generated by mixture of emitted light in different colors, the openings of the pixel defining layer 163 are formed inner than the deposition regions of the organic light-emitting material with margins specified depending on the precision of the manufacturing process. In a deposition region of the organic light-emitting material for B, two B-light emitting regions (whereas one B-light emitting region corresponds to two sub-pixels) are formed to be distant by a predetermined space for a margin specified depending on the precision of the manufacturing process.

The perforating walls 164 are disposed between OLED elements and not to overlap with the OLED elements so as not to interfere with the display function. In the example of FIG. 6, the perforating walls 164 are disposed between adjacent B-light emitting regions. In an example, the perforating walls 164 are disposed regularly within the display region 125 to provide a favorable touch panel function.

For example, the number of perforating walls 164 per pixel may be fixed (whereas the number is not necessarily an integer but less than one). In the example of FIG. 6, one perforating wall 164 is provided for each pair of adjoining B-light emitting regions. In other words, 0.5 perforating wall 164 is provided for one pixel.

Figure 7:
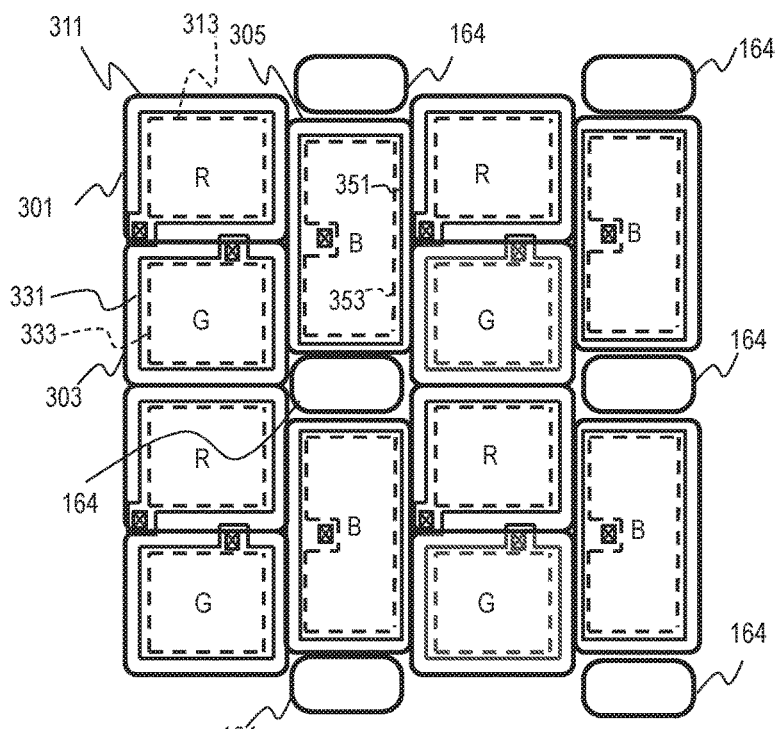
FIG. 7 schematically illustrates another example of arrangement of sub-pixels and perforating walls.

FIG. 7 schematically illustrates another example of arrangement of sub-pixels and perforating walls. The difference from the arrangement of FIG. 6 is that one B-light emitting region (organic light-emitting layer 165 for B) does not lie across two pixels and is separated for individual sub-pixels. The perforating walls 164 are disposed between adjacent OLED elements for B sub-pixels. One perforating wall 164 is provided for one pixel.

Figure 8:
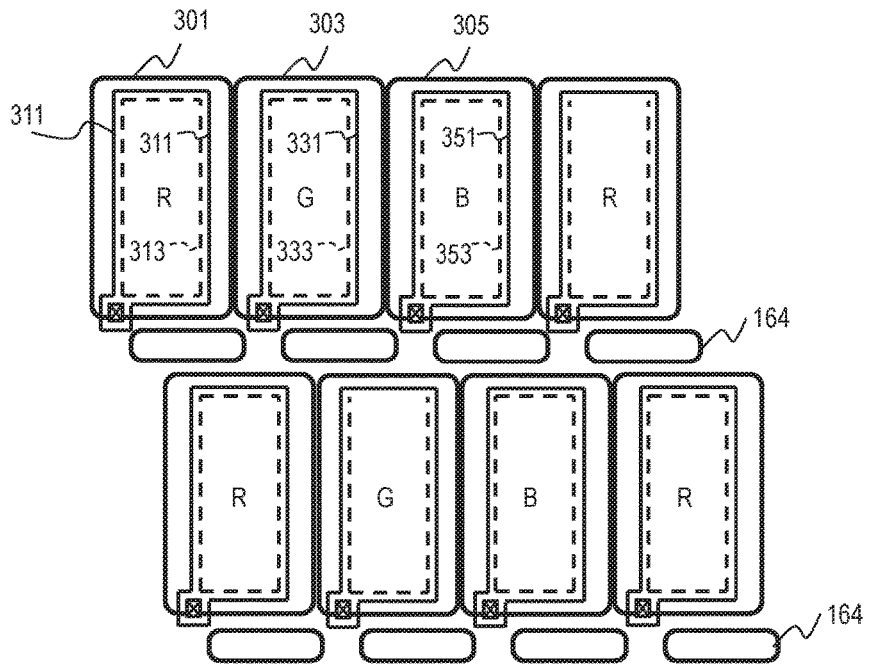
FIG. 8 schematically illustrates another example of arrangement of sub-pixels and perforating walls.
Figure 9:
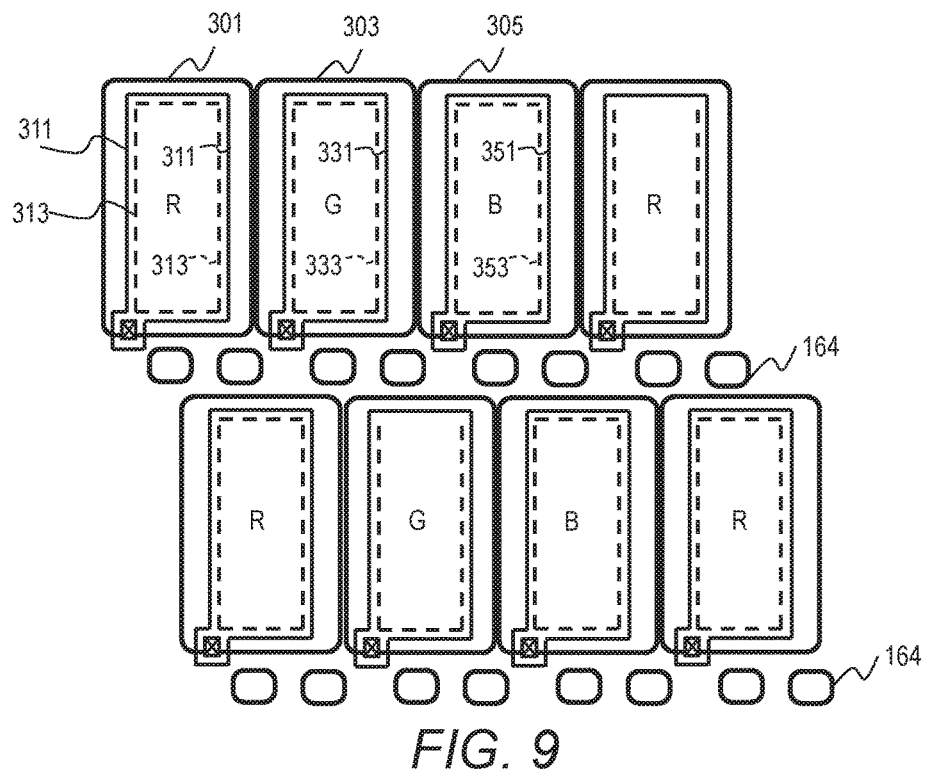
FIG. 9 schematically illustrates another example of arrangement of sub-pixels and perforating walls.

FIGS. 8 and 9 schematically illustrate still other examples of arrangement of sub-pixels and perforating walls. The pixel layouts in FIGS. 8 and 9 are of delta arrangement. The sub-pixels of R, G, and B are disposed to repeat the same pattern in the row direction. The patterns of sub-pixels are the same among the rows. Each row of sub-pixels is shifted by a half of the width of a pixel with respect to the adjacent rows. Perforating walls 164 are provided between adjacent rows of sub-pixels. Three perforating walls 164 are provided per pixel in the example of FIG. 8; six perforating walls 164 are provided per pixel in the example of FIG. 9. Rows of perforating walls 164 are provided between adjacent rows of sub-pixels.

The pixel arrangement to apply the panel structure of this embodiment is not limited to a specific one; for example, any pixel arrangement selected from stripe arrangement, mosaic arrangement, pentile arrangement, and the like can be employed for the display device of this embodiment.

Figure 10:
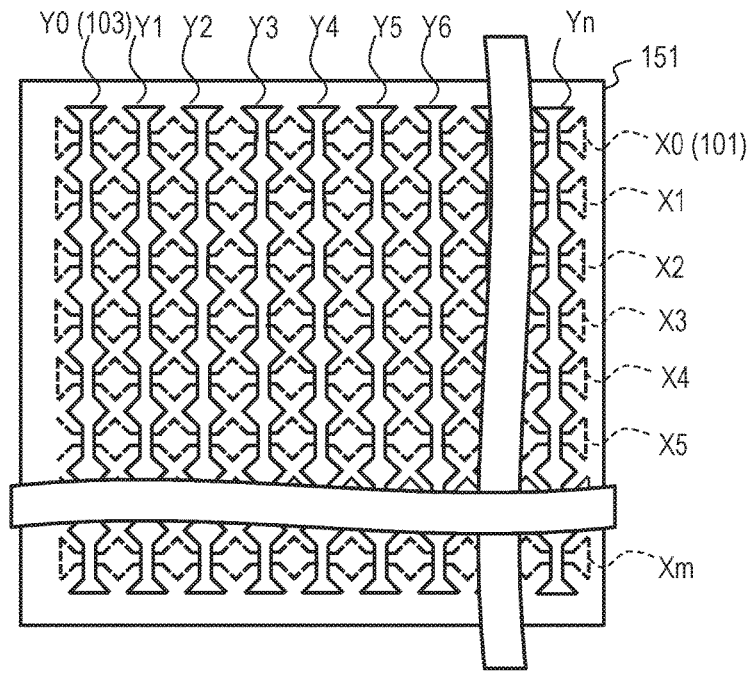
FIG. 10 schematically illustrates a configuration example (an example of arrangement) of touch panel electrodes.

FIG. 10 schematically illustrates a configuration example (an example of arrangement) of touch panel electrodes. Each of the X electrodes (such as Tx electrodes) X0 to Xm (where m is an integer not less than 4) has a shape such that multiple rhombic electrode pieces are connected by connectors into a string. That is to say, one X electrode is formed by electrically connecting horizontally-adjacent rhombic pieces with connectors to extend horizontally. In similar, each of the Y electrodes (such as Rx electrodes) Y0 to Yn (where n is an integer not less than 5) has a shape such that multiple rhombic electrode pieces are connected by connectors into a string. That is to say, one Y-electrode is formed by electrically connecting vertically-adjacent rhombic pieces with connectors to extend vertically.

When viewed vertically to the insulating substrate 151, the connectors of the rhombic electrode pieces of the X electrodes X0 to Xm and the connectors of the rhombic pieces of the Y electrodes Y0 to Yn are overlapped with each other with an insulating film interposed therebetween. The rhombic electrode pieces of the X electrodes X0 to Xm are not overlapped with the rhombic electrode pieces of the Y electrodes Y0 to Yn. The rhombic electrode pieces of the X electrodes and the rhombic electrode pieces of the Y electrodes are arrayed on the same layer or on different layers.

The shape of a touch panel electrode is not limited to a specific shape. For example, an X electrode and a Y electrode may have square electrode pieces and the four sides of each electrode piece may lie in parallel to the four sides of the insulating substrate 151. The X electrode or the Y electrode may be a single rectangular electrode extending in one direction.

Figure 11:
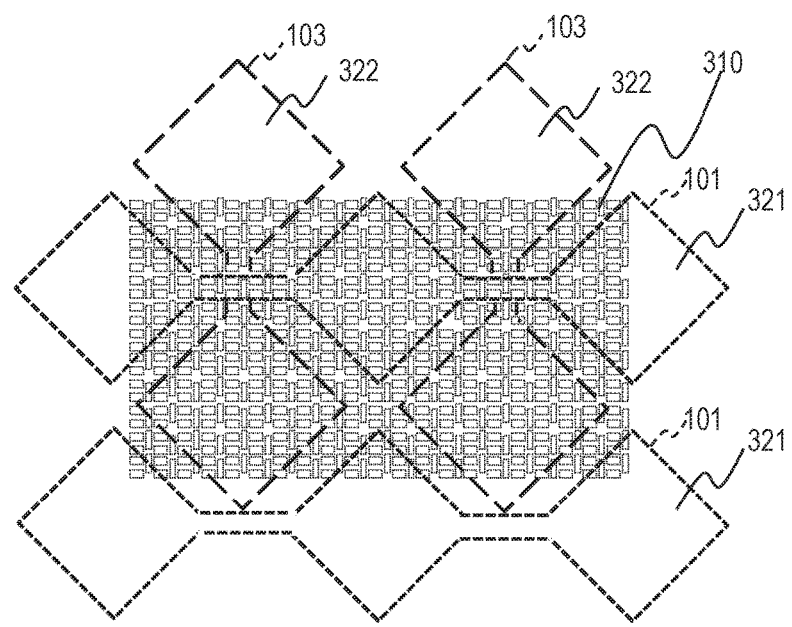
FIG. 11 schematically illustrates an example of the relation of the sizes between touch panel electrodes and pixels (sub-pixels).

FIG. 11 schematically illustrates an example of the relation of the sizes between the touch panel electrodes and the pixels (sub-pixels). The Tx electrodes 101 and the Rx electrodes 103 are arranged to have a diagonal mosaic array structure shown in FIG. 10. Each Tx electrode 101 has multiple rhombic electrode pieces 321. Each Rx electrode 103 has multiple rhombic electrode pieces 322. As illustrated in FIG. 11, multiple pixels 310 are included within a region of a single rhombic electrode piece 321 or 322; for example, tens to hundreds of pixels 310 are disposed to lie over a rhombic electrode piece 321 or 322.

As set forth above, an embodiment of this invention has been described; however, this invention is not limited to the foregoing embodiment. Those skilled in the art can easily modify, add, or convert each element in the foregoing embodiment within the scope of this invention. A part of the configuration of one embodiment may be replaced with a configuration of another embodiment or a configuration of an embodiment may be incorporated into a configuration of another embodiment.

What is claimed is:

1. A display device comprising:
   an insulating substrate;
   an encapsulation structural unit opposed to the insulating substrate;
   a plurality of lower electrodes and one upper electrode disposed between the insulating substrate and the encapsulation structural unit, and a plurality of organic light-emitting layers each disposed between the one upper electrode and one of the plurality of lower electrodes;
   a plurality of perforating walls standing toward the encapsulation structural unit;
   a plurality of circuits formed between the insulating substrate and the lower electrodes and configured to control supply of electric current to the lower electrodes; and
   touch panel electrodes formed between the insulating substrate and the plurality of lower electrodes,
   wherein the upper electrode is an electrode configured to transmit light from the organic light-emitting layers toward the encapsulation structural unit and has holes each formed in such a manner that one of the plurality of perforating walls stands through the hole, and
   wherein electric fields generated by the touch panel electrodes pass through the holes in the upper electrodes.

2. The display device according to claim 1, wherein the plurality of lower electrodes are disposed on the same plane and one organic light-emitting layer is disposed over one lower electrode.

3. The display device according to claim 2, further comprising:
   first lines and second lines connected with a detection circuit configured to detect a contact point of a pointer onto the encapsulation structural unit based on change of the electric fields,
   wherein the touch panel electrodes are formed on a first insulating film formed over the insulating substrate,
   wherein the touch panel electrodes include first electrodes electrically connected with the first lines and second electrodes formed on a second insulating film formed over the first electrodes and the first insulating film and electrically connected with the second lines, and
   wherein the plurality of circuits are formed between a third insulating film formed over the second insulating film and the second electrodes and the lower electrodes.

4. The display device according to claim 3, wherein the plurality of circuits include a semiconductor layer formed on the third insulating film, a fourth insulating film covering the semiconductor layer and the third insulating film, gate electrodes formed on the fourth insulating film at locations above the semiconductor layer, a fifth insulating film covering the gate electrodes and the fourth insulating film, and a planarization film formed on the fifth insulating film.

5. The display device according to claim 4,
   wherein the plurality of lower electrodes, a part of the first lines, and a part of the second lines are formed on the planarization film,
   wherein the first lines are electrically connected with the first electrodes through holes formed in the second to the fifth insulating films and the planarization film laminated together, and
   wherein the second lines are electrically connected with the second electrodes through holes formed in the third to the fifth insulating films and the planarization film laminated together.

6. The display device according to claim 4,
   wherein the plurality of lower electrodes are formed on the planarization film,
   wherein a part of the first lines and a part of the second lines are formed on the fifth insulating film,
   wherein the first lines are electrically connected with the first electrodes through holes formed in the second to the fifth insulating films laminated together, and
   wherein the second lines are electrically connected with the second electrodes through holes formed in the third to the fifth insulating films and the planarization film laminated together.

7. The display device according to claim 1,
   wherein the one upper electrode, the plurality of lower electrodes, and the organic light-emitting layers form a plurality of organic light emitting elements,
   wherein the organic light emitting elements are separated by a pixel defining layer, and
   wherein the perforating walls are formed on the surface of the pixel defining layer.

8. The display device according to claim 1, wherein the plurality of circuits are disposed below the lower electrodes.

9. The display device according to claim 1, further comprising a detection circuit configured to detect a contact point of a pointer onto the encapsulation structural unit based on change of the electric fields.

10. The display device according to claim 1, wherein each of the perforating walls has one of an inverted tapered shape, a normal tapered shape, and a vertical shape.

11. The display device according to claim 1, wherein the touch panel electrodes are made of a metal having a high melting point.

12. The display device according to claim 1, wherein the touch panel electrodes are formed between the insulating substrate and the plurality of circuits.

13. The display device according to claim 12, wherein each of the plurality of circuits includes a source electrode, a drain electrode, and a channel connected with the source electrode and the drain electrode, and
wherein the source electrodes, the drain electrodes and touch panel lines connecting the touch panel electrodes include a common metal layer.

14. The display device according to claim 1, wherein each of the plurality of perforating walls is located between lower electrodes.

15. The display device according to claim 1, wherein the plurality of perforating walls are disposed regularly in such a manner that numbers of perforating walls per pixel are uniform.

16. The display device according to claim 15, further comprising a driver IC,
wherein the driver IC includes integrally a driving circuit of the plurality of circuits and a driving circuit of the touch panel electrodes.

17. A method of manufacturing a display device, comprising:
forming touch panel electrodes above an insulating substrate;
forming a plurality of circuits above the insulating substrate;
forming a plurality of lower electrodes each connected to one of the plurality of circuits on a layer upper than the plurality of circuits;
forming a plurality of perforating walls standing from the insulating substrate on a layer upper than the plurality of lower electrodes;
forming an organic light-emitting layer on the plurality of lower electrodes after forming the plurality of perforating walls; and
forming an upper electrode having a plurality of holes through which the plurality of perforating walls stand and being common to the plurality of lower electrodes by applying a transparent conductive material onto the insulating substrate where the organic light-emitting layer and the plurality of perforating walls are exposed.

18. A display device comprising:
an insulating substrate;
an encapsulation structural unit opposed to the insulating substrate;
a plurality of lower electrodes and one upper electrode disposed between the insulating substrate and the encapsulation structural unit and a plurality of organic light-emitting layers each disposed between the one upper electrode and one of the plurality of lower electrodes;
a plurality of circuits formed between the insulating substrate and the lower electrodes and configured to control supply of electric current to the lower electrodes; and
touch panel electrodes formed between the insulating substrate and the plurality of lower electrodes,
wherein the upper electrode is an electrode configured to transmit light emitted from the organic light-emitting layers toward the encapsulation structural unit, and
wherein the upper electrode has holes configured to pass electric fields generated by the touch panel electrodes through the holes.

* * * * *